US011093885B2

(12) United States Patent
Arora et al.

(10) Patent No.: US 11,093,885 B2
(45) Date of Patent: Aug. 17, 2021

(54) OPERATIONS AUGMENTED ENTERPRISE COLLABORATIVE RECOMMENDER ENGINE

(71) Applicant: International Business Machines Corporation, Armonk, NY (US)

(72) Inventors: Pritpal Arora, Bangalore (IN); Klaus Koenig, Essenheim (DE); Jonathan Richard Young, Guildford (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 208 days.

(21) Appl. No.: 16/253,326

(22) Filed: Jan. 22, 2019

(65) Prior Publication Data

US 2020/0234217 A1    Jul. 23, 2020

(51) Int. Cl.
*G06Q 10/06* (2012.01)
(52) U.S. Cl.
CPC ..... *G06Q 10/06393* (2013.01); *G06Q 10/067* (2013.01); *G06Q 10/0637* (2013.01)
(58) Field of Classification Search
None
See application file for complete search history.

(56) References Cited

U.S. PATENT DOCUMENTS

| | | | |
|---|---|---|---|
| 6,836,773 B2 | 12/2004 | Tamayo et al. | |
| 9,536,225 B2 | 1/2017 | Rallapalli et al. | |
| 10,505,825 B1* | 12/2019 | Bettaiah | G06F 16/285 |
| 2004/0098392 A1* | 5/2004 | Dill | G06F 8/70 |
| 2014/0095231 A1 | 4/2014 | Cherusseri et al. | |
| 2014/0222521 A1 | 8/2014 | Chait | |
| 2015/0087407 A1 | 3/2015 | Hate | |
| 2017/0031958 A1 | 2/2017 | Miller | |
| 2018/0181625 A1* | 6/2018 | Lyons | G06F 16/285 |

OTHER PUBLICATIONS

Umesh Harigopal, Cognizant Enterprise Maturity Model (CEMM), IEEE Transactions on Systems, Man, and Cybernetics—Part C: Applications and Reviews, vol. 31, No. 4, Nov. 2001 (Year: 2001).*
Raden et al., Enterprise Decision Management uses BI to Power Up Operational Systems, Teradata Corporation, Jun. 2008.

* cited by examiner

*Primary Examiner* — Jerry O'Connor
*Assistant Examiner* — Matthew H Divelbiss
(74) *Attorney, Agent, or Firm* — Garg Law Firm, PLLC; Rakesh Garg; Christopher Pignato

(57) ABSTRACT

Providing enterprise recommendations includes determining a change of a maturity score of an enterprise architecture assessment domain model associated with an enterprise architecture. The change of the maturity score is indicative of a change of a maturity state of the enterprise architecture assessment domain model. One or more maturity model types that exceed a predetermined degree of change are determined, and at least one assessment capability group for each maturity model type is determined. One or more assessment capabilities are selected for each assessment capability group based on one or more selection criteria. One or more recommendation templates are selected for each selected assessment capability based upon one or more template selection rules. A first set of recommendations are compiled based on the selected recommendation templates, and the first set of recommendations are output.

19 Claims, 6 Drawing Sheets

OPERATIONS AUGMENTED ENTERPRISE COLLABORATIVE RECOMMENDER ENGINE

TECHNICAL FIELD

The present invention relates generally to a method, system, and computer program product for an enterprise architecture recommendation systems. More particularly, the present invention relates to a method, system, and computer program product for an operations augmented enterprise collaborative recommender engine to provide enterprise recommendations.

BACKGROUND

Enterprise architecture describes a structure, intercomponent relationships, and operation of resources and assets in an information technology (IT) environment of an organization to determine how the organization can effectively achieve desired goals, functions, or objectives using the resources and assets. Enterprise architecture often involves analyzing, designing, planning, and implementing one or more IT systems using the resources and assets to achieve the desired goals, functions, or objectives. Enterprise architecture often enables decision makers of an organization to analyze the current effectiveness of the organization in meeting the desired goals, functions, or objectives, and make decisions to better realize the goals, functions, or objectives. These decisions often involve making changes to the enterprise architecture to enable better realization of the goals, functions, or objective of the organization.

SUMMARY

The illustrative embodiments provide a method, system, and computer program product. An embodiment of a computer-implemented method includes determining a change of a maturity score of an enterprise architecture assessment domain model associated with an enterprise architecture. In the embodiment, the change of the maturity score is indicative of a change of a maturity state of the enterprise architecture assessment domain model. The embodiment further includes determining one or more maturity model types that exceed a predetermined degree of change, and determining at least one assessment capability group for each maturity model type. The embodiment further includes selecting one or more assessment capabilities for each assessment capability group based on one or more selection criteria. The embodiment further includes selecting one or more recommendation templates for each selected assessment capability based upon one or more template selection rules. The embodiment further includes compiling a first set of recommendations based on the selected recommendation templates, and outputting the first set of recommendations.

In another embodiment, the selection criteria includes selecting assessment capabilities for which a maturity score associated with a maturity model type is lower than a configured acceptable score.

In another embodiment, the template selection rules include selecting recommendation templates in which a difference of a configured best practice score and a maturity model score, multiplied by an impact factor, is greater than a configured threshold level.

In another embodiment, the first set of recommendations include recommendations for an account within the enterprise architecture for increasing the maturity level of the enterprise architecture.

Another embodiment further includes determining one or more information technology operational analytics (ITOA) outputs associated with the first set of recommendations, and determining one or more analytics capability groups for each ITOA output. The embodiment further includes selecting one or more of the first set of recommendations for each of the one or more analytics capability groups. The embodiment further includes combining the first set of recommendations and associated ITOA outputs.

Another embodiment further includes extracting one or more keyword phrases and one or more concept tags from the combined first set of recommendations and associated ITOA outputs. The embodiment further includes building a query context from the extracted keyword phrases and concept tags, and submitting a query to a knowledge base using the query context.

In another embodiment, the one or more keyword phrases and one or more concept tags are extracted using cognitive processing.

Another embodiment further includes receiving a ranked list of a second set of recommendations based upon results of a search of the knowledge base using the query context.

In another embodiment, the ranked list of the second set of recommendations is ranked based upon frequencies of one or more of the extracted keyword phrases and concept tags within each of the second set of recommendations. In another embodiment, the ranked list of the second set of recommendations is based upon a term frequency-inverse document frequency (TF-IDF) algorithm. In another embodiment, the second set of recommendations provide contextual recommendations associated with the query context for an enterprise account.

Another embodiment further includes outputting the ranked list of the second set of recommendations.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
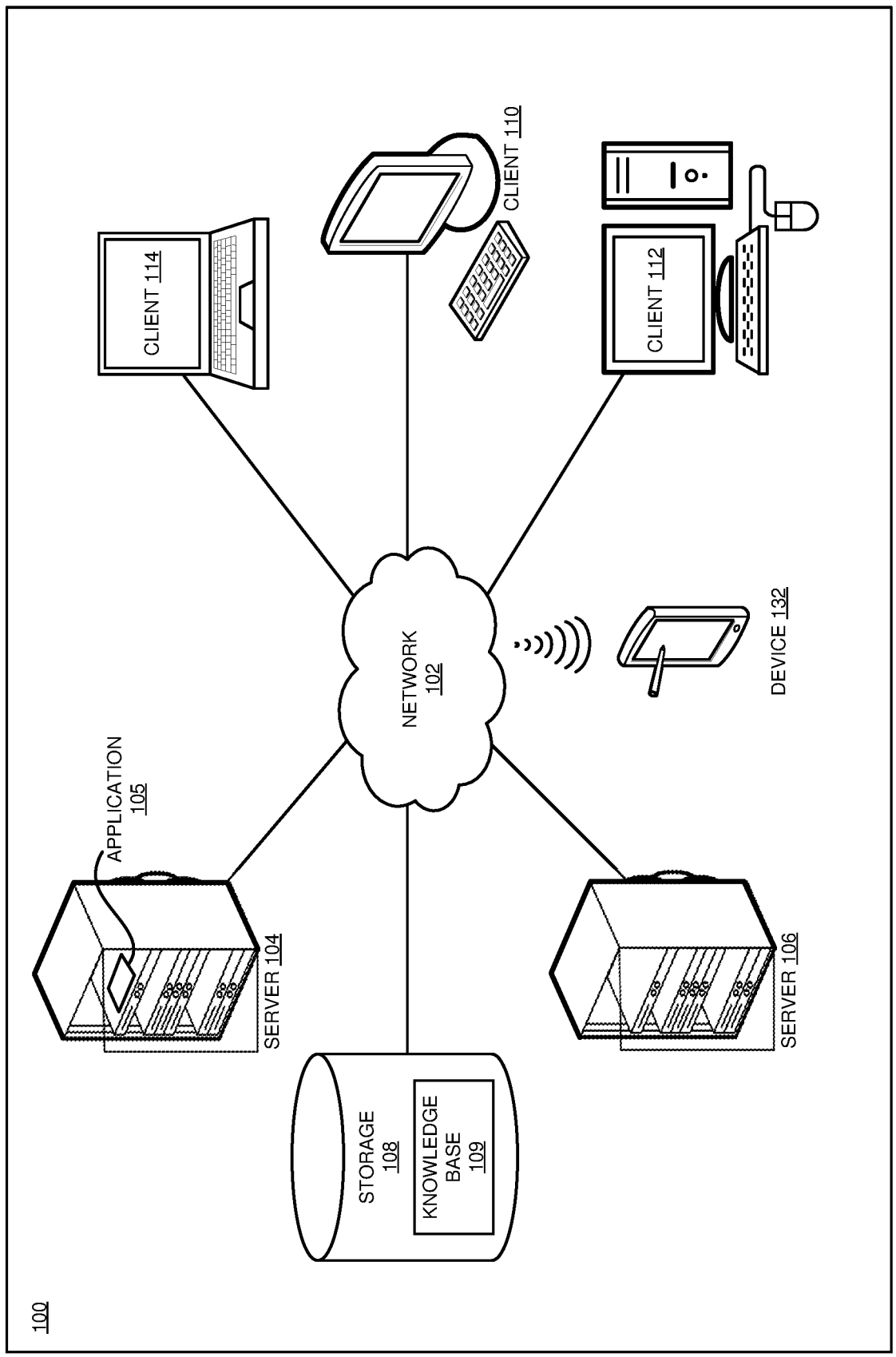
FIG. 1 depicts a block diagram of a network of data processing systems in which illustrative embodiments may be implemented.

Some embodiments of the present invention involve the concept of "maturity" of computer and/or computer software systems and/or sub-systems. As the term is used herein, maturity within the realm of an enterprise health-check assessment is considered as a set of qualitative and quantitative factors measuring how well developed technical and operational disciplines of IT environments are, and how capable they actually are in dependence on the enterprise's business objectives, the operating environment, and industry practices. Maturity may further refer to the current state of the enterprise operational risk which also measures the resilience, security vulnerability, skill levels, susceptibility to outages, penalty clauses, etc. pertaining to multiple business, technical and operational processes domains.

An underlying maturity model may utilize a scale providing a reference point where potential IT and process management shortcomings exist and set targets where the IT and process management capabilities need to be. These potential maturity gaps against the target state are translated to operational risks providing attributes of improvement actions. Non-exhaustive examples of such attributes may include: (1) existence, clarity, and adoption of IT related policies, plans and procedures; (2) coverage and adoption of tools and automation enabling continuous improvement and end-to-end management; (3) adoption of good practice in IT system currency, configuration, resiliency, security, compliance, availability, reliability, integrity, efficiency, and effectiveness; (4) adoption of adequate skills and expertise used in operational disciplines; (5) adoption of governance disciplines including the right mix of responsibilities and accountabilities; and (6) adoption of and activities around outcome measures, such as key goal indicators indicating whether appropriate goals have been met, and performance indicators indicating whether goals are likely to be met.

A list of non-exhaustive factors that may be relevant to maturity of a computer system or sub-system (herein called a component-of-interest] are: (i) amount of time the component-of-interest has been operating; (ii) amount of time the component-of-interest has been operating without a serious error or crash; (iii) number of processing cycles the component-of-interest has been operating; (iv) number of processing cycles the component-of-interest has been operating without a serious error or crash; (v) number of data communications or transaction that the component-of-interest has been involved in; (vi) number of data communications or transactions that the component-of-interest has been involved in without a serious error or crash; (vii) amount of time components configured similar or identical to the component-of-interest have been operating; (viii) amount of time components configured similar or identical to the component-of-interest has been operating without a serious error or crash; (ix) number of processing cycles components configured similar or identical to the component-of-interest have been operating; (x) number of processing cycles components configured similar or identical to the component-of-interest has been operating without a serious error or crash; (xi) number of data communications or transaction that components configured similar or identical to the component-of-interest have been involved in; (xii) number of data communications or transactions that components configured similar or identical to the component-of-interest have been involved in without a serious error or crash.

The illustrative embodiments described herein are directed to an operations augmented enterprise collaborative recommender engine for providing enterprise recommendations. Embodiments recognize that current enterprise decision making and recommendation systems provide fairly limited enterprise recommendations on the basis of surveys, small and medium-sized enterprise (SME) insights, best practices, and gaps found in client IT environments.

Embodiments further recognize that current operational analytic tools provide operational data about servers, network, storage, middleware, and databases, and generates visualization and analytics regarding availability and performance management. However, these operational analytics tools do not cross-link to specific recommendations and actions or resolve business level pain points. Further, embodiments recognize that current enterprise environments suffer with problematic situations, outages and replenished systems as there is no crossover of operational analytics and enterprise recommendation systems to produce agile pointers to resolve systemic issues. Embodiments still further recognize that current state assessment of an enterprise does not provide an accurate real-time status of the current operations scenario as the operations scenario is often dynamic in nature, and does not amalgamate observations from operational SMEs and analytics together to a single platform.

An embodiment of an operations augmented enterprise collaborative recommender engine for providing enterprise recommendations based on health-controls, IT operational analytics (ITOA) outcomes, and a knowledge base includes an operations augmented enterprise collaborative recommender engine having a basic rule based recommendation compilation component and an extended cognitive recommendation builder component. In the embodiment, the basic rule based recommendation compilation component is configured to provide a mapping table of what capabilities of one or more assessment measures belong to specific domains in a EA domain model which represents a current maturity state of the EA domain model. In the embodiment, the basic rule based recommendation compilation component is configured to additionally associated a basic recommendation body with individual or grouped capabilities of the assessment. In the embodiment, the association is based on rules weighting of change dynamics of an EA assessment maturity change. In the embodiment, a maturity state describes how well the behaviors, practices, and processes of an organization can reliably and sustainably produce required outcomes.

In the embodiment, the basic rule based recommendation compilation component performs basic rule based recommendation compilation by associating assessment measures link to a dynamic maturity state of EA assessment, and compiling a list of basic recommendations from the change dynamics in support of a rule engine. In one or more embodiments, a recommendation provides an indication of how best to resolve issues within the EA.

In the embodiment, the extended cognitive recommendation builder component processes the compiled list of basic recommendations combined with ITOA outcomes and measures to extract keywords as a ranked list of phrases, and submit the keywords to an indexed knowledge base. In the embodiment, the knowledge base responds with a sorted list of knowledge base recommendations based upon a ranking and similarity algorithm of term frequencies in the documents such as a term frequency-inverse document frequency (TF-IDF) algorithm. In the embodiment, the extended cognitive recommendation builder component associates recommendation bodies to assessment measures in which the content of recommendation bodies are combined with an outcome of IT operational analytics to compile a query to the knowledge base.

One or more embodiments provide for a recommendation context creation module configured with an analytics capability in order to associate operational analytic outcomes to appropriate basic recommendations as well as provide for an annotation capability including the extraction of ranked keywords and phrases from both basic recommendations and ITOA outcomes.

One or more embodiments provide for association of assessment measures linked up to a dynamic maturity state of EA assessment deriving basic recommendations in support of a rules engine. One or more embodiments provide for a dynamic recommendation configuration module triggered by a changed maturity state on specific EA assessment domains to perform automated recommendation compilation based upon impacted maturity model types and assessment capabilities.

One or more embodiments provide for personalized and contextual recommendations for an enterprise account based upon health-controls, self-assessments and generated service delivery metrics.

An embodiment can be implemented as a software application. The application implementing an embodiment can be configured as a modification of an existing application or platform, as a separate application that operates in conjunction with an existing application or platform, a standalone application, or some combination thereof.

The illustrative embodiments are described with respect to certain types of tools and platforms, procedures and algorithms, services, devices, data processing systems, environments, components, enterprise systems, enterprise components, applications, and recommendations, only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
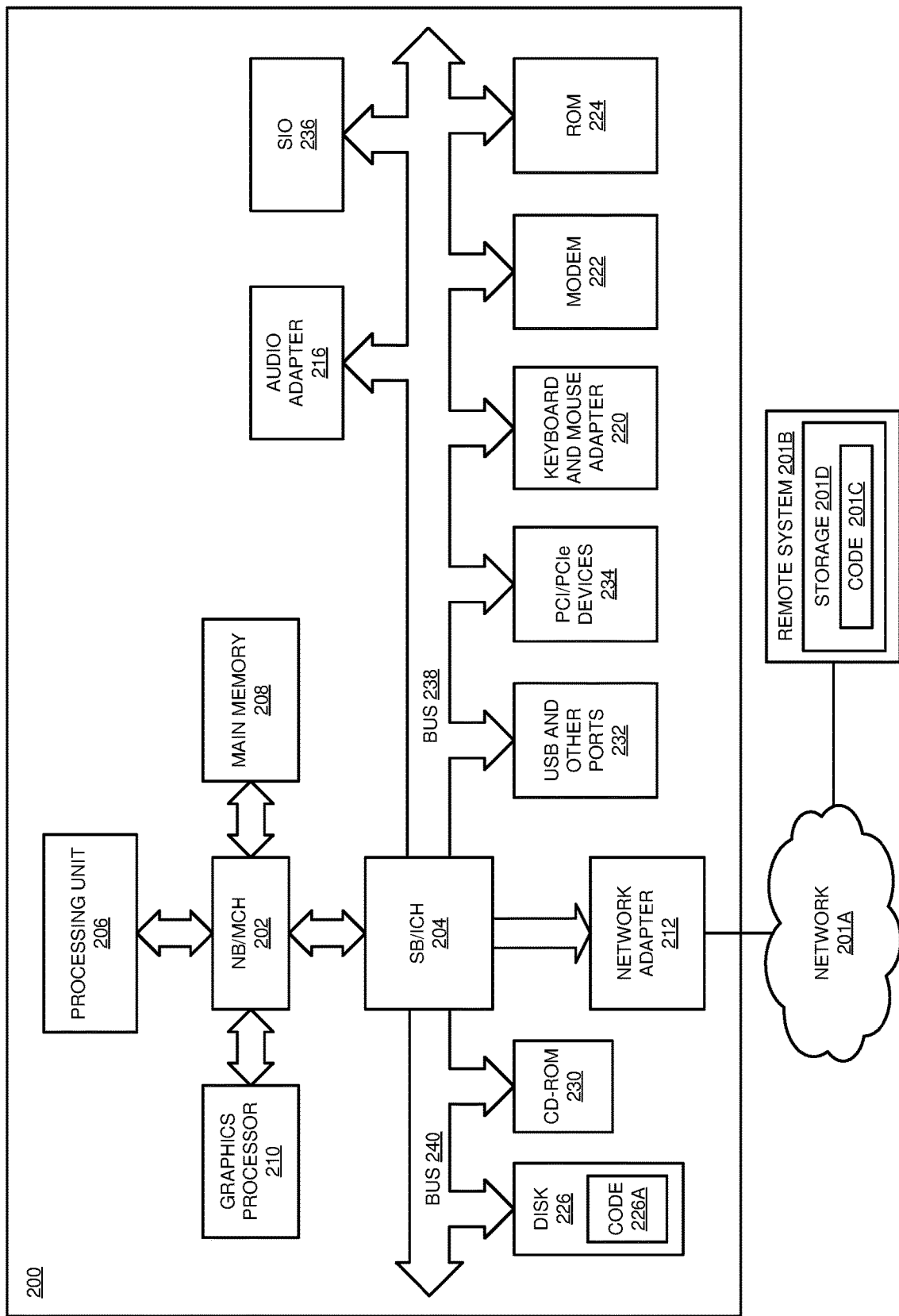
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage device 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Servers 104 and 106, storage device 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown. Server 104 includes an application 105 that may be configured to implement one or more of the functions described herein for an operations augmented enterprise collaborative recommender engine to provide enterprise recommendations in accordance with one or more embodiments.

Storage device 108 includes an indexed knowledge base 109 configured to store one or more recommendations and provide a ranked list of extended recommendations to application 105 as described herein with respect to one or more embodiments.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as device 132 or server 104 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
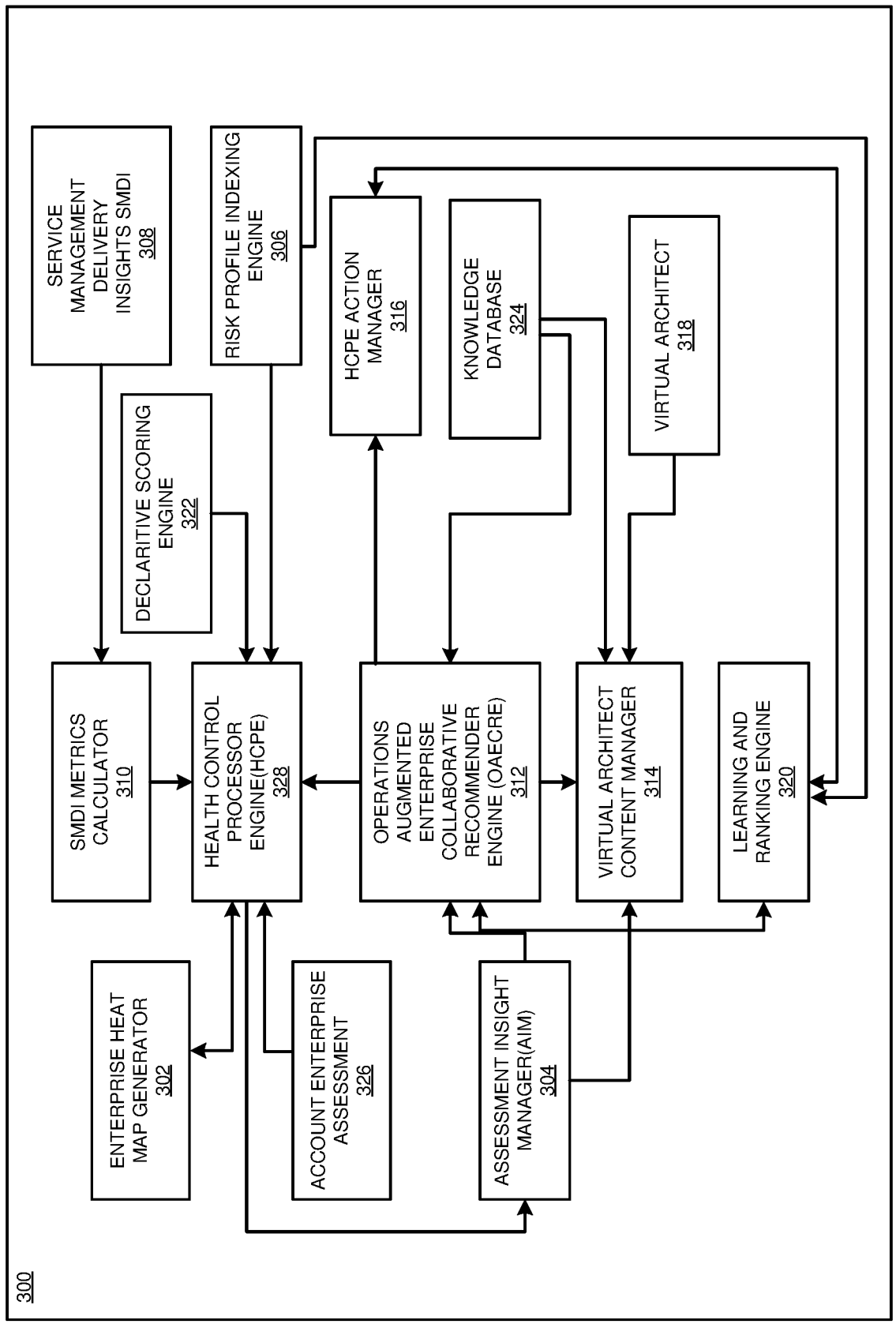
FIG. 3 depicts a block diagram of an example architecture for an operations augmented enterprise collaborative recommender engine to provide enterprise recommendations in accordance with an illustrative embodiment.

With reference to FIG. 3, this figure depicts a block diagram of an example architecture 300 for an operations augmented enterprise collaborative recommender engine to provide enterprise recommendations in accordance with an illustrative embodiment. Example architecture 300 includes of FIG. 3 includes an enterprise heat map generator 302, an assessment insight manager (AIM) 304, a risk profile indexing engine 306, service management delivery insights (SMDI) 308, SMDI metrics calculator 310, an operations augmented enterprise collaborative recommender engine (OAECRE) 312, a virtual architect content manager 314, an HOPE action manager 316, a virtual architect 318, a learning and ranking engine 320, a declarative scoring engine 322, a knowledge base 324, an account enterprise assessment 326, and a health control processor engine (HOPE) 328.

In the embodiment, HOPE 328 provides for orchestration and business workflows with AIM 304, risk profile indexing engine 306, and SMDI 308. In some embodiments, the HOPE 328 can amalgamate and process various measurements arising from the service delivery metrics as well as the health control indicators. HOPE 328 by computer implemented mechanisms can trigger certain action events. For example, HOPE 328 can trigger certain health control validations, refresh of contents, health-check assessments getting updated, metrics getting updated and combinations thereof. Some of the action events can be used to rebuild a heat-map topology view, re-run a recommendation manager to provide for new recommendations, provide new proactive notifications for ranking scores, and trigger a subscription engine.

As described above, HOPE 328 provides for orchestration and business workflows in combination with AIM 304. In various embodiments, an "insight" is a thought, fact, combination of facts, data and/or analysis of data that induces meaning and furthers understanding of a situation or issue that has the potential of benefiting the business or re-directing the thinking about that situation or issue which then in turn has the potential of benefiting the business. In one or more embodiments, AIM 304 can provide key insights, patterns of answers and scores on the various combinations of self-assessment answers provided by chief architects (CAs), as well as small and medium enterprise (SME) inputs to self-assessments. In one or more embodiments, AIM 304 can provide a systemic view of the issues with business management across all domains and geographies. In one or more embodiments, AIM 304 provides insights of self-assessments to virtual architect content manager 314. In one or more embodiments, AIM 304 receives health control data and associated metrics from HOPE 328.

In the embodiment, enterprise heat map generator 302 provides a dynamic, heat map having selectable regions that can be activated by graphic user interface (GUI) present on a computer screen displayed from a computer, which allows a user to examine the maturity scores at each level and domain. In some embodiments, enterprise heat map generator 302 provides references to assessments performed on an account technology plan, technical risk mitigation, a client relationship, technical governance, and operational stability, etc. In one or more embodiments, enterprise heat map generator 302 provides domain priority information to HOPE 328.

In the embodiment, OAECRE 312 provides cognitive recommendations for an account based on health-controls, self-assessments and generated service delivery metrics to HOPE 328. In an embodiment, OAECRE 312 uses a cognitive solution to interpret a user entered "description" of an issue, identify associated keywords (not necessarily keywords found in the description, but those associated with an understanding of the issue) based on inputs being derived from HOPE 328.

In the embodiment, risk profile indexing engine 306 calculates risk scores based upon an outcome of a maturity assessment provided by SMDI calculator 310 by applying a set of parameterized goals and common metrics. In some embodiments, risk profile indexing engine 306 provides an extension engine to SMDI calculator 310 in terms of handling a different compute, with different business rule-sets and processes a different data-set derived from the maturity assessment score. In some embodiments, risk profile indexing engine 306 can also provide risk patterns mapping back to the health control processor self-assessment queries. In this example, the risk pattern maps will obtain feedback from health control processor engine (HOPE) 328 self-assessment queries. In some embodiments, risk profile indexing engine 306 can build and compile risk-based vector patterns and is able to generate time series analysis of vectors, compare across accounts, compute average vectors as a benchmark for an industry standard, and check for trends and patterns in and across accounts with vectors for each industry and/or geographic location.

In the embodiment, HOPE action manager 316 handles action managements, and post inputs from an observation recommendation repository (ORR) and recommender engine, i.e., OAECRCE 312, in terms of interacting with dynamic automation to trigger actions on the basis of a work flow rules engine, maintaining status, checking success criteria of actions, providing with multiple and alternative, parallel courses of actions, value tracking, success/failure dashboards, and combinations thereof. In one or more embodiments, ORR is a knowledge-base referred to by HOPE 328. In one or more embodiments, HOPE action manager 316 can further take into account expert review of actions to capture sentiment analysis related to the action, and refine, update based on work flow engines and tie up back to ranking/learning cycles as example linking reviews to reasons for selecting actions. In one or more embodiments, OAECRE 312 provides actions to HOPE action manager 316.

SMDI 308 is an insights analytic engine that includes server configuration data, operation and management data, which when combined with statistical, and text analysis provides insights to drive costs savings and revenue opportunities. The management data may include tickets, alerts and compliance notices. One example of a revenue opportunity may be through contract renewals. Another example of a revenue opportunity may be through a new logo deal. SMDI 308 provides service delivery metrics to the SMDI metrics calculator 310.

In the embodiment, SMDI metrics calculator 310 can parameterize various goals, performs various computes on the metrics from SMDI based on business rules, performs key performance indicator (KPI) aggregations, and can provide positive/lag indicators. In one or more embodiments, SMDI metrics calculator 310 can also map goals to metrics and KPIs. In some embodiments, SMDI metrics calculator 310 performs machine level statistics and rolls up higher to build up maturity assessment ranking scores based on various metrics calculations fed to risk profile indexing engine 306 to derive risk based scores.

In the embodiment, virtual architect (VA) 318 provides a self-service capability for consumers, e.g., chief architects of the enterprise, to interact with the multiple knowledge bases and global best practices. In some embodiments, virtual architect (VA) 318 simplifies the discovery of applicable assets when issues or degraded services on the IT environment are detected, and provides an automated clustering of best recommendations of how to resolve these issues.

In the embodiment, learning and ranking engine 320 is a cognitive continuous learning engine that functions with declarative scoring engine 322 to continuously record and learn based upon human actions performed in terms of rules and decisions taken from training datasets. In the embodiment, declarative scoring engine 322 contains pre-existing rule-sets for various computations of metrics, health-assessment scores, heat-map rules, recommendation choices, risk evaluation criteria, and combinations thereof.

In the embodiment, virtual architect content manager 314 is responsible for annotating, ingesting and managing different data-sources emanating from multiple data-sources and knowledge databases, and provides a single query interface with a standard adapter to all the knowledge databases such as an account self-assessment repository. In the embodiment, knowledge database 324 provides recommendations and best practices to OAECRE 312. In the embodiment, account enterprise assessment 326 provides health control, goals, enablers and indicators to HOPE 328.

Figure 4:
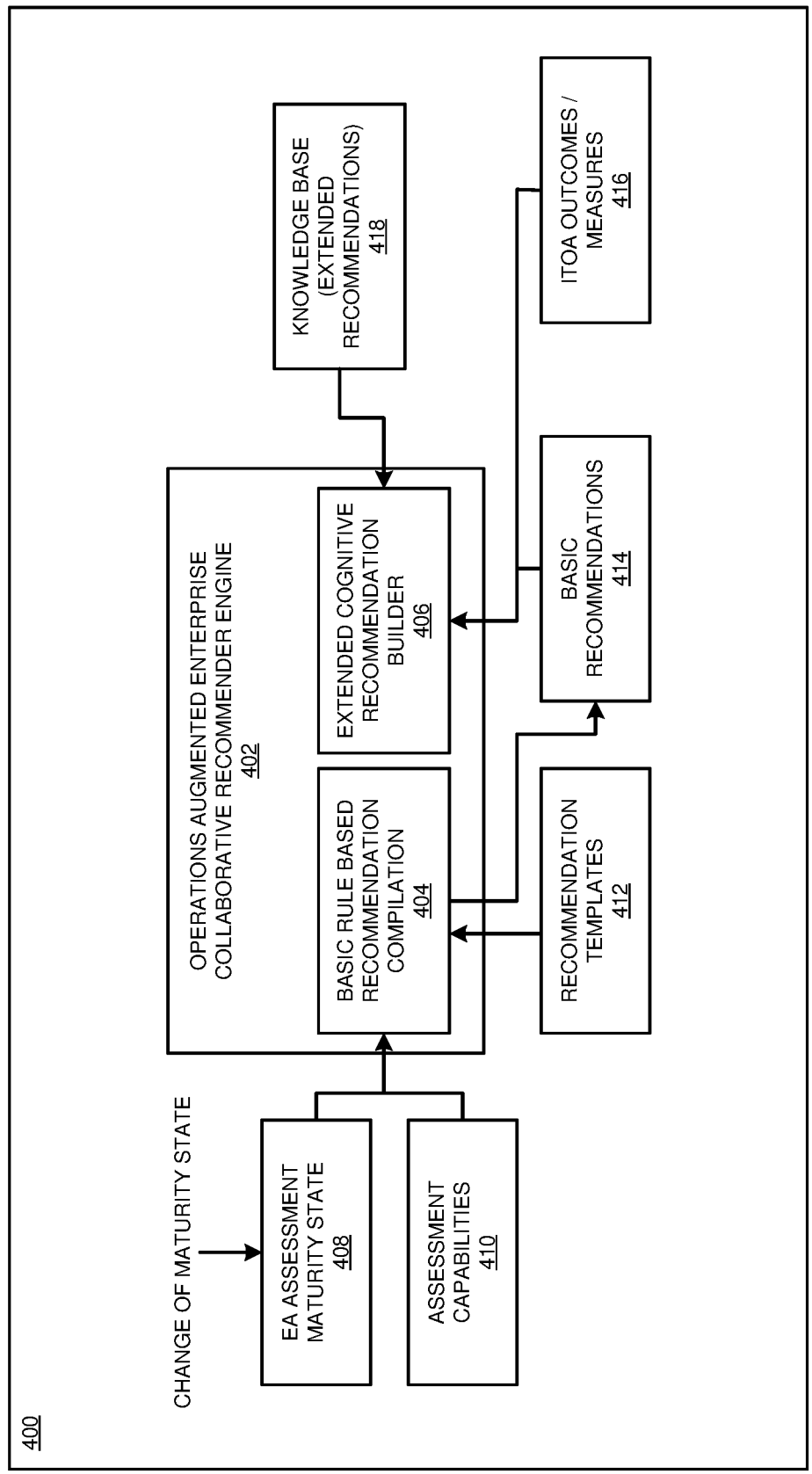
FIG. 4 depicts a block diagram of an example configuration for an operations augmented enterprise collaborative recommender engine in accordance with an illustrative embodiment.

With reference to FIG. 4, this figure depicts a block diagram of an example configuration 400 for an operations augmented enterprise collaborative recommender engine in accordance with an illustrative embodiment. An operations augmented enterprise collaborative recommender engine 402 includes a basic rule based recommendation compilation component 404 and an extended cognitive recommendation builder component 406.

In the embodiment, basic rule based recommendation compilation component 404 provides a set of assessment capabilities coupled to one or more EA assessment domain model scores to a recommendation configuration module. Basic rule based recommendation compilation component 404 is configured with an assessment capability table including a mapping of EA maturity model types with assessment capability groups, and a recommendation rules table including recommendation templates 412 of the appropriate assessment capabilities. The recommendation configuration module is triggered by a change of an EA assessment maturity state 408 on specific EA assessment domains to perform automated recommendation compilation based on impacted maturity model types and assessment capabilities 410.

In one or more embodiments, basic rule based recommendation compilation component 404 determines if a change of maturity state indicated by new or updated maturity score of the EA assessment domain model is available. Responsive to determining a change of maturity state, basic rule based recommendation compilation component 404 determines the maturity model types that exceed a predetermined degree of change based on maturity model clipping level. In the embodiment, basic rule based recommendation compilation component 404 determines assessment capability groups for each maturity model type the assessment capability table.

In the embodiment, basic rule based recommendation compilation component 404 selects the assessment capabilities for each assessment capability group based on capability selection criteria. In particular embodiments, the selection criteria include capabilities in which an updated/changed maturity score of maturity model type is lower than a configured "good practice" or acceptable score of the capability. In the embodiment, basic rule based recommendation compilation component 404 selects recommendation templates for each selected assessment capability based upon one or more template selection rules. In particular embodiments, the template selection rules include selecting recommendation templates in which a difference of a configured best practice score and new maturity model score, multiplied by an impact factor, is greater than a configured clipping threshold level. In the embodiment, basic rule based recommendation compilation component 404 compiles basic recommendations 414 based on the selected recommendation templates.

In the embodiment, extended cognitive recommendation builder component 406 provides the list of basic recommendations 414 coupled with IT operational analytics (ITOA) outcomes/measures 416 to a recommendation context creation module configured with an analytics capability table to associate ITOA outcomes/measures 418 to the appropriate basic recommendations 414. In one or more embodiments, extended cognitive recommendation builder component 406 implements an annotation capability including the extraction of ranked keywords and phrases from both basic recommendations 414 and ITOA outcomes/measures 416. In an embodiment, extended cognitive recommendation builder component 406 submits the combined ranked list of keywords/phrases to an indexed knowledge base 418 that provides extended recommendations based on a ranking and similarity algorithm of term frequencies in the documents such as an TF-IDF algorithm. In one or more embodiments, the recommendation context creation module of extended cognitive recommendation builder component 406 is triggered by new incoming basic recommendations 414 and output generated by analytics tools (e.g., ITOA outcomes/measures) to perform an automated recommendation compilation.

In an embodiment, extended cognitive recommendation builder component 406 determines if new basic recommendations 414 and ITOA outcomes/measures 416 are available, and determines analytics capability groups for each ITOA outcome/measure 416 using the analytics capability table. In the embodiment, extended cognitive recommendation builder component 406 selects the associated basic recommendations 414 for each analytics capability group based on analytics capability selection criteria. In particular embodiments, the analytics capability selection criteria are analytics capabilities with a match to assessment capabilities of basic recommendations 414 including the rank index calculated by basic rule based recommendation compilation component 404 as a difference of the configured best practice score and the new maturity model score.

In the embodiment, extended cognitive recommendation builder component 406 combines associated basic recommendations 414 and appropriate ITOA outcome/measures 416 weighted in the calculated rank index, and builds a query context by extracting keyword phrases and concept tags from the combined recommendations/ITOA analytics outcomes/measures. In the embodiment, extended cognitive recommendation builder component 406 uses the query context to submit a query to indexed knowledge base 418, and receives a ranked list of extended recommendations from knowledge base 418. In one or more embodiments, the extended recommendations provide personalized and contextual recommendations for an enterprise account based on health-controls, self-assessments and generated service delivery metrics.

Figure 5:
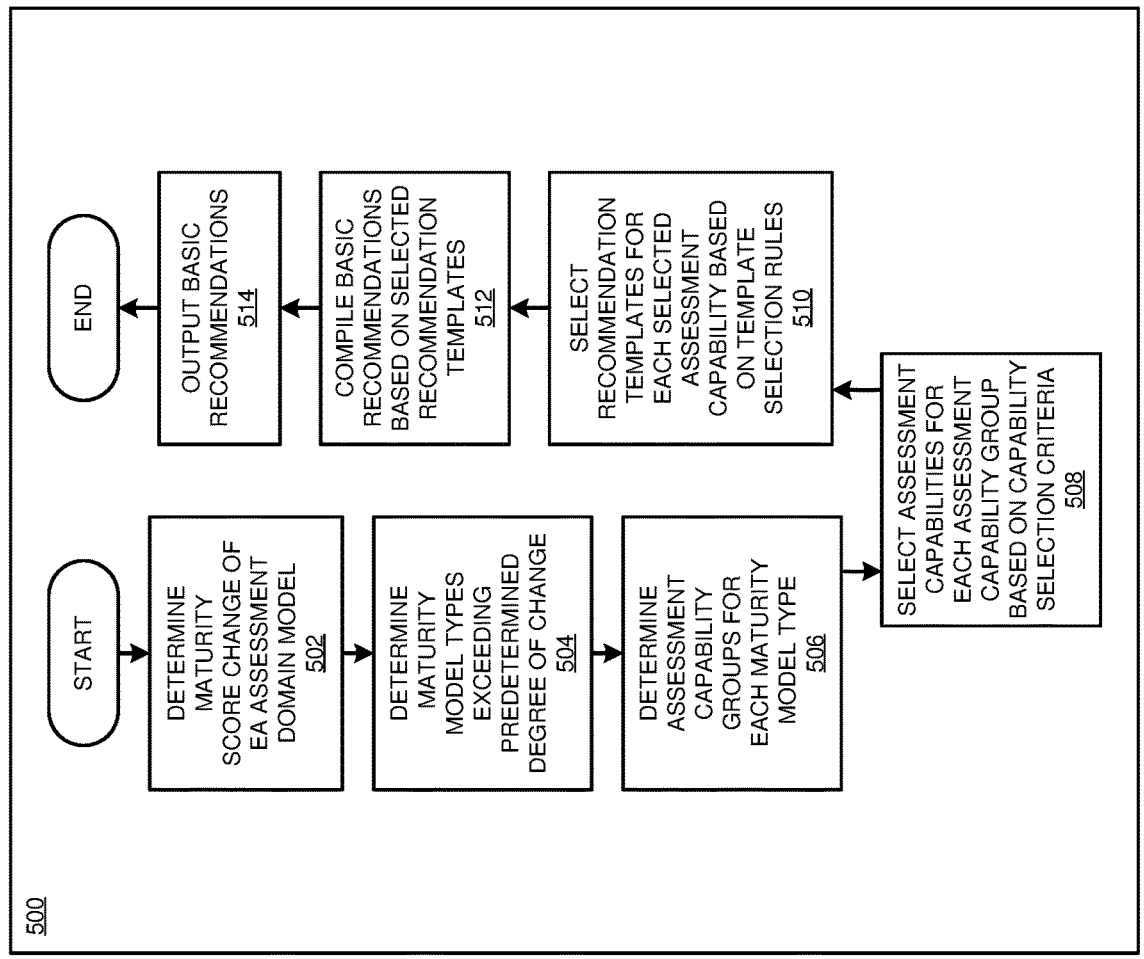
FIG. 5 depicts a flowchart of an example process for an operations augmented enterprise collaborative recommender engine to provide enterprise recommendations in accordance with an illustrative embodiment.

With reference to FIG. 5, this figure depicts a flowchart of an example process 500 for an operations augmented enterprise collaborative recommender engine to provide enterprise recommendations in accordance with an illustrative embodiment. In block 502, application 105 determines a change of a maturity score of an EA assessment domain model indicative of a change of maturity state of the EA assessment domain model. In a particular embodiment, the change in maturity score is responsive to receiving a new or updated maturity score of the EA assessment domain model. Responsive to determining a change of maturity state, in block 504 application 105 determines one or more maturity model types that exceed a predetermined degree of change based on maturity model clipping threshold level. In block 506, application 105 determines assessment capability groups for each maturity model type using an assessment capability table mapping maturity model types to associated assessment capabilities.

In block 508, application 105 selects one or more assessment capabilities for each assessment capability group based on capability selection criteria. In particular embodiments, the selection criteria include capabilities in which an updated/changed maturity score of maturity model type is lower than a configured "good practice" or acceptable score of the capability. In block 510, application 105 selects one or more recommendation templates for each selected assessment capability based upon one or more template selection rules. In particular embodiments, the template selection rules include selecting recommendation templates in which a difference of a configured best practice score and new maturity model score, multiplied by an impact factor, is greater than a configured clipping threshold level.

In block 512, application 105 compiles basic recommendations based on the selected recommendation templates. In one or more embodiments, the basic recommendations include recommendations for updating the enterprise architecture towards increased maturity. In one embodiments, the basic recommendations include recommendations for an account within the enterprise architecture for increasing the maturity level of the enterprise architecture based upon enterprise assessments. In block 514, application 105 outputs the basic recommendations. Process 500 then ends.

Figure 6:
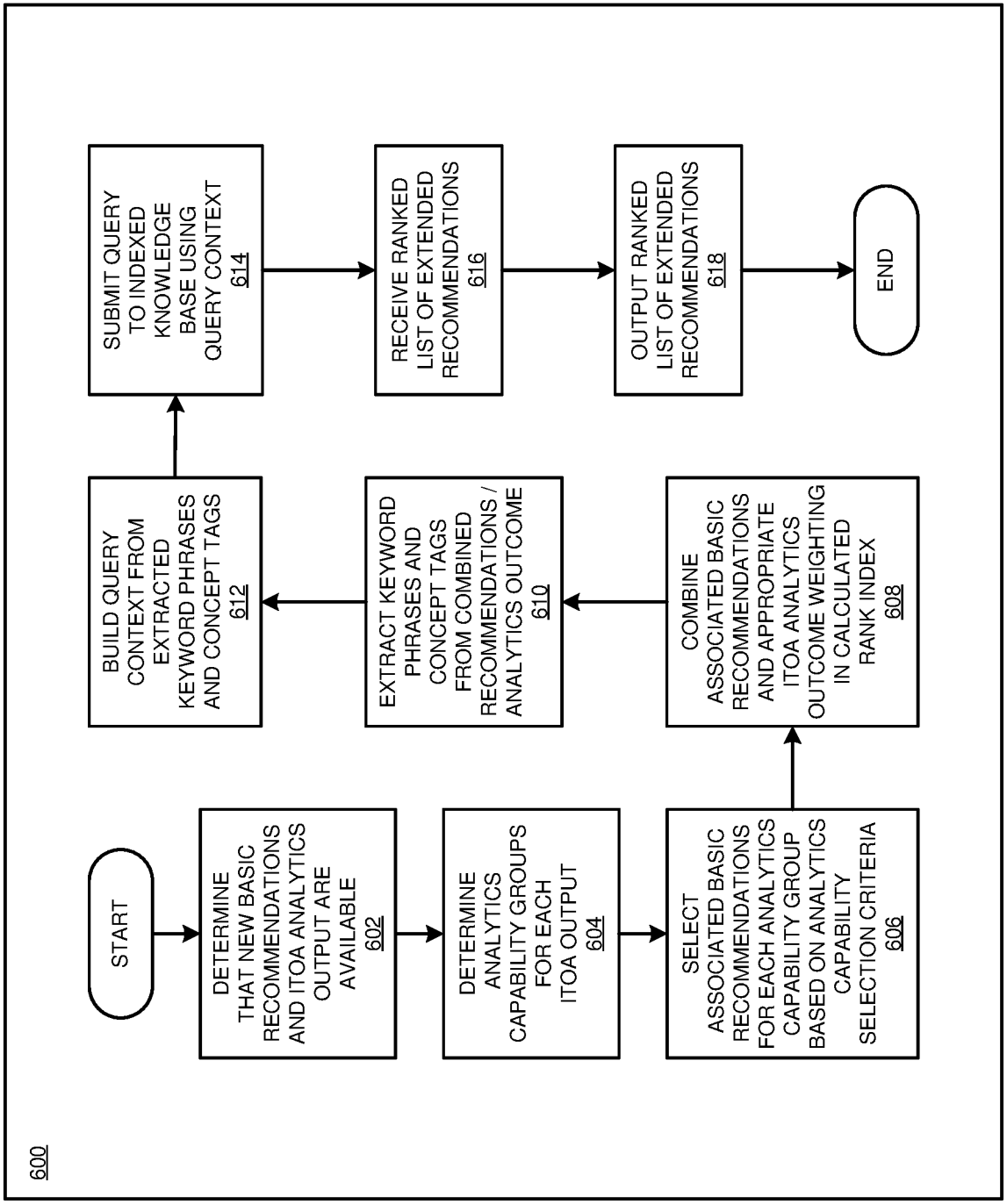
FIG. 6 depicts a flowchart of another example process for an operations augmented enterprise collaborative recommender engine to provide enterprise recommendations in accordance with an illustrative embodiment.

With reference to FIG. 6, this figure depicts a flowchart of another example process 600 for an operations augmented enterprise collaborative recommender engine to provide enterprise recommendations in accordance with an illustrative embodiment. In block 602, application 105 determines that one or more new basic recommendations and one or more associated ITOA outputs are available. In block 604, application 105 determines analytics capability groups for each ITOA output using an analytics capability table.

In block 606, application 105 selects associated basic recommendations for each analytics capability group based on analytics capability selection criteria. In particular embodiments, the analytics capability selection criteria are analytics capabilities with a match to assessment capabilities of the basic recommendations including a rank index calculated as a difference of a configured best practice score and a new maturity model score.

In block 608, application 105 combines associated basic recommendations and appropriate ITOA outputs weighted in the calculated rank index. In block 610, application 105 extracts keyword phrases and concept tags from the combined basic recommendations/ITOA outputs using cognitive processing such as natural language processing (NLP). In block 612, application 105 builds a query context from the extracted keyword phrases and concept tags. In block 614, application 105 submits a query to an indexed knowledge base using the query context.

In block 616, application 105 receives a ranked list of extended recommendations from the indexed knowledge base based upon results of a search of the knowledge base using the query context. In one or more embodiments, the ranked list of the extended recommendations is ranked based upon frequencies of one or more of the extracted keyword phrases and concept tags within each of the extended recommendations. In one or more embodiments, the ranked list of extended recommendations is based upon a ranking and similarity algorithm of term frequencies in the documents such as a term frequency-inverse document frequency (TF-IDF) algorithm. In one or more embodiments, the extended recommendations provide personalized and contextual recommendations associated with the query context for an enterprise account. In block 618, application 105 outputs the ranked list of extended recommendations. Process 600 then ends.

Thus, a computer implemented method, system or apparatus, and computer program product are provided in the illustrative embodiments for an operations augmented enterprise collaborative recommender engine to provide enterprise recommendations and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    generating, automatically in response to a change to a dynamic maturity state of an enterprise architecture, a knowledge base query of query keywords extracted from an operational analytics outcome and from an associated assessment recommendation,
    wherein the assessment recommendation includes a resolution for an issue within the enterprise architecture based on an architecture assessment, and
    wherein the assessment recommendation is associated with the operational analytics outcome based on a match between assessment capabilities and analytics capabilities,
    wherein the generating comprises:
        determining a change of a maturity score of an enterprise architecture assessment domain model associated with the enterprise architecture, the change of the maturity score indicative of the change of the maturity state of the enterprise architecture assessment domain model;
        responsive to determining the change of the maturity score, determining one or more maturity model types that exceed a predetermined degree of change;
        determining at least one assessment capability group for each maturity model type using an assessment capability table that maps maturity model types to assessment capabilities;
        selecting one or more assessment capabilities for each assessment capability group based on one or more selection criteria;
        selecting one or more recommendation templates for each selected assessment capability based upon one or more template selection rules;
        automatically compiling a first set of recommendations based on the selected recommendation templates, wherein the first set of recommendations includes the assessment recommendation;
        outputting the first set of recommendations;
        determining one or more information technology operational analytics (ITOA) outputs associated with the first set of recommendations, wherein the one or more ITOA outputs includes the operational analytics outcome;
        determining one or more analytics capability groups for each ITOA output;
        selecting one or more of the first set of recommendations for each of the one or more analytics capability groups based on analytics capability selection criteria,
        wherein the analytics capability selection criteria include analytics capabilities matched to assessment capabilities of the first set of recommendations, and
        wherein the selecting of the one or more of the first set of recommendations comprises associating the assessment recommendation with the operational analytics outcome;
        combining the first set of recommendations and associated ITOA outputs;
        extracting one or more keyword phrases and one or more concept tags from the combined first set of recommendations and associated ITOA outputs,
        wherein the one or more keyword phrases comprise the query keywords;
        building a query context from the extracted keyword phrases and concept tags; and
    searching the knowledge base using the query context; and
    generating a ranked list of a second set of recommendations based upon results of a search of the knowledge base using the query context,
    wherein the generating of the ranked list of the second set of recommendations comprises:
        determining a term frequency-inverse document frequency (TF-IDF) value for the extracted keyword phrases and concept tags within each of the second set of recommendations; and
        sorting the second set of recommendations according to the TF-IDF values to yield the ranked list,
    wherein the ranked list provides personalized and contextual recommendations for an enterprise account based on health-controls, self-assessments and generated service delivery metrics.

2. The computer-implemented method of claim 1, wherein the selection criteria include selecting assessment capabilities for which a maturity score associated with a maturity model type is lower than a configured acceptable score.

3. The computer-implemented method of claim 1, wherein the template selection rules include selecting recommendation templates in which a difference of a configured best practice score and a maturity model score, multiplied by an impact factor, is greater than a configured threshold level.

4. The computer-implemented method of claim 1, wherein the first set of recommendations include recommendations for an account within the enterprise architecture for increasing the maturity score.

5. The computer-implemented method of claim 1, wherein the one or more keyword phrases and one or more concept tags are extracted using cognitive processing.

6. The computer-implemented method of claim 1, wherein the second set of recommendations provides contextual recommendations associated with the query context for an enterprise account.

7. The computer-implemented method of claim 1, further comprising:
outputting the ranked list of the second set of recommendations.

8. The computer system of claim 1, further comprising:
displaying, via a graphical user interface, a heat map that includes the maturity score.

9. A computer usable program product comprising one or more computer-readable storage devices, and program instructions stored on at least one of the one or more storage devices, the stored program instructions comprising:
program instructions to generate, automatically in response to a change to a dynamic maturity state of an enterprise architecture, a knowledge base query of query keywords extracted from an operational analytics outcome and from an associated assessment recommendation,
wherein the assessment recommendation includes a resolution for an issue within the enterprise architecture based on an architecture assessment, and
wherein the assessment recommendation is associated with the operational analytics outcome based on a match between assessment capabilities and analytics capabilities,
wherein the program instructions to generate comprise:
program instructions to determine a change of a maturity score of an enterprise architecture assessment domain model associated with the enterprise architecture, the change of the maturity score indicative of the change of the maturity state of the enterprise architecture assessment domain model;
program instructions to, responsive to determining the change of the maturity score, determine one or more maturity model types that exceed a predetermined degree of change;
program instructions to determine at least one assessment capability group for each maturity model type using an assessment capability table that maps maturity model types to assessment capabilities;
program instructions to select one or more assessment capabilities for each assessment capability group based on one or more selection criteria;
program instructions to select one or more recommendation templates for each selected assessment capability based upon one or more template selection rules;
program instructions to automatically compile a first set of recommendations based on the selected recommendation templates, wherein the first set of recommendations includes the assessment recommendation;
program instructions to output the first set of recommendations;
program instructions to determine one or more information technology operational analytics (ITOA) outputs associated with the first set of recommendations,
wherein the one or more ITOA outputs includes the operational analytics outcome;
program instructions to determine one or more analytics capability groups for each ITOA output;
program instructions to select one or more of the first set of recommendations for each of the one or more analytics capability groups based on analytics capability selection criteria,
wherein the analytics capability selection criteria include analytics capabilities matched to assessment capabilities of the first set of recommendations, and
wherein the program instructions to select one or more of the first set of recommendations comprises program instructions to associate the assessment recommendation with the operational analytics outcome;
program instructions to combine the first set of recommendations and associated ITOA outputs;
program instructions to extract one or more keyword phrases and one or more concept tags from the combined first set of recommendations and associated ITOA outputs,
wherein the one or more keyword phrases comprise the query keywords;
program instructions to build a query context from the extracted keyword phrases and concept tags; and
program instructions to search the knowledge base using the query context; and
program instructions to generate a ranked list of a second set of recommendations based upon results of a search of the knowledge base using the query context,
wherein the program instructions to generate the ranked list of the second set of recommendations comprises:
program instructions to determine a term frequency-inverse document frequency (TF-IDF) value for the extracted keyword phrases and concept tags within each of the second set of recommendations; and
program instructions to sort the second set of recommendations according to the TF-IDF values to yield the ranked list,
wherein the ranked list provides personalized and contextual recommendations for an enterprise account based on health-controls, self-assessments and generated service delivery metrics.

10. The computer usable program product of claim 9, wherein the selection criteria include selecting assessment capabilities for which a maturity score associated with a maturity model type is lower than a configured acceptable score.

11. The computer usable program product of claim 9, wherein the template selection rules include selecting recommendation templates in which a difference of a configured best practice score and a maturity model score, multiplied by an impact factor, is greater than a configured threshold level.

12. The computer usable program product of claim 9, wherein the first set of recommendations include recommendations for an account within the enterprise architecture for increasing the maturity score.

13. The computer usable program product of claim 9, wherein the computer usable code is stored in a computer readable storage device in a data processing system, and wherein the computer usable code is transferred over a network from a remote data processing system.

14. The computer usable program product of claim 9, wherein the computer usable code is stored in a computer readable storage device in a server data processing system, and wherein the computer usable code is downloaded over a network to a remote data processing system for use in a computer readable storage device associated with the remote data processing system.

15. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
 program instructions to generate, automatically in response to a change to a dynamic maturity state of an enterprise architecture, a knowledge base query of query keywords extracted from an operational analytics outcome and from an associated assessment recommendation,
 wherein the assessment recommendation includes a resolution for an issue within the enterprise architecture based on an architecture assessment, and
 wherein the assessment recommendation is associated with the operational analytics outcome based on a match between assessment capabilities and analytics capabilities,
 wherein the program instructions to generate comprise:
  program instructions to determine a change of a maturity score of an enterprise architecture assessment domain model associated with the enterprise architecture, the change of the maturity score indicative of the change of the maturity state of the enterprise architecture assessment domain model;
  program instructions to, responsive to determining the change of the maturity score, determine one or more maturity model types that exceed a predetermined degree of change;
  program instructions to determine at least one assessment capability group for each maturity model type using an assessment capability table that maps maturity model types to assessment capabilities;
  program instructions to select one or more assessment capabilities for each assessment capability group based on one or more selection criteria;
  program instructions to select one or more recommendation templates for each selected assessment capability based upon one or more template selection rules;
  program instructions to automatically compile a first set of recommendations based on the selected recommendation templates, wherein the first set of recommendations includes the assessment recommendation;
  program instructions to output the first set of recommendations;
  program instructions to determine one or more information technology operational analytics (ITOA) outputs associated with the first set of recommendations,
 wherein the one or more ITOA outputs includes the operational analytics outcome;
  program instructions to determine one or more analytics capability groups for each ITOA output;
  program instructions to select one or more of the first set of recommendations for each of the one or more analytics capability groups based on analytics capability selection criteria,
 wherein the analytics capability selection criteria include analytics capabilities matched to assessment capabilities of the first set of recommendations, and
 wherein the program instructions to select one or more of the first set of recommendations comprises program instructions to associate the assessment recommendation with the operational analytics outcome;
  program instructions to combine the first set of recommendations and associated ITOA outputs;
  program instructions to extract one or more keyword phrases and one or more concept tags from the combined first set of recommendations and associated ITOA outputs,
 wherein the one or more keyword phrases comprise the query keywords;
  program instructions to build a query context from the extracted keyword phrases and concept tags; and
 program instructions to search the knowledge base using the query context; and
 program instructions to generate a ranked list of a second set of recommendations based upon results of a search of the knowledge base using the query context,
 wherein the program instructions to generate the ranked list of the second set of recommendations comprises:
  program instructions to determine a term frequency-inverse document frequency (TF-IDF) value for the extracted keyword phrases and concept tags within each of the second set of recommendations; and
  program instructions to sort the second set of recommendations according to the TF-IDF values to yield the ranked list,
 wherein the ranked list provides personalized and contextual recommendations for an enterprise account based on health-controls, self-assessments and generated service delivery metrics.

16. The computer usable program product of claim 9, wherein the one or more keyword phrases and one or more concept tags are extracted using cognitive processing.

17. The computer usable program product of claim 9, wherein the second set of recommendations provides contextual recommendations associated with the query context for an enterprise account.

18. The computer usable program product of claim 9, further comprising:
 program instructions to output the ranked list of the second set of recommendations.

19. The computer system of claim 15, wherein the one or more keyword phrases and one or more concept tags are extracted using cognitive processing.

* * * * *